United States Patent
Almohsin et al.

(10) Patent No.: US 11,261,367 B2
(45) Date of Patent: Mar. 1, 2022

(54) POLYMER-SAND NANOCOMPOSITE FOR WATER SHUTOFF

(71) Applicants: Saudi Arabian Oil Company, Dhahran (SA); Alfaisal University, Riyadh (SA)

(72) Inventors: Ayman Almohsin, Doha (SA); Edreese Alsharaeh, Riyadh (SA); Mohammed Abdullah Bataweel, Dhahran (SA)

(73) Assignees: Saudi Arabian Oil Company, Dhahran (SA); Alfaisal University, Riyadh (SA)

( * ) Notice: Subject to any disclaimer, the term of this patent is extended or adjusted under 35 U.S.C. 154(b) by 0 days.

(21) Appl. No.: 16/854,274

(22) Filed: Apr. 21, 2020

(65) Prior Publication Data
US 2021/0324256 A1    Oct. 21, 2021

(51) Int. Cl.
*C09K 8/512* (2006.01)
*E21B 33/138* (2006.01)
(Continued)

(52) U.S. Cl.
CPC .............. *C09K 8/512* (2013.01); *B29C 35/18* (2013.01); *C08K 3/042* (2017.05); *C08K 3/11* (2018.01); *C09K 8/516* (2013.01); *E21B 33/138* (2013.01)

(58) Field of Classification Search
CPC .................................. C08K 3/04; E21B 33/138
See application file for complete search history.

(56) References Cited

U.S. PATENT DOCUMENTS 5,465,792 A    11/1995   Dawson et al.
8,557,916 B1   10/2013   Alsharaeh et al.
(Continued)

FOREIGN PATENT DOCUMENTS

CN    104558323 A    4/2015
CN    104710584 A    6/2015
(Continued)

OTHER PUBLICATIONS

International Search Report and Written Opinion dated Feb. 10, 2021 pertaining to International application No. PCT/US2020/055339 filed Oct. 13, 2020, 15 pgs.
(Continued)

*Primary Examiner* — Khanh T Nguyen
(74) *Attorney, Agent, or Firm* — Dinsmore & Shohl LLP

(57) ABSTRACT

A method of preparing a polymer-sand nanocomposite for water shutoff. The method includes applying a surface polymerization to sand particles. The surfaced polymerization formed by combining a polymerization initiator dissolved in a solvent with the sand particles to form a precursor sand mixture, combining a co-monomer and additional polymerization initiator in the presence of graphene, where the graphene is not functionalized, to form a precursor polymer mixture, and combining the precursor sand mixture and the precursor polymer mixture to form a sand-copolymer-graphene nanocomposite. The method further includes drying the sand-copolymer-graphene nanocomposite, preparing a polymer hydrogel, and combining the polymer hydrogel and the sand-copolymer-graphene nanocomposite to crosslink the components and form the polymer-sand nanocomposite. The associated method of forming a barrier to shut off or reduce unwanted production of water in a subterranean formation utilizing the polymer-sand nanocomposite is also provided.

12 Claims, 4 Drawing Sheets

(51) Int. Cl.
   *C09K 8/516* (2006.01)
   *C08K 3/04* (2006.01)
   *C08K 3/11* (2018.01)
   *B29C 35/18* (2006.01)

(56) References Cited

U.S. PATENT DOCUMENTS

| | | |
|---|---|---|
| 2016/0340570 A1 | 11/2016 | Salla et al. |
| 2016/0347985 A1 | 12/2016 | Li et al. |
| 2017/0044687 A1 | 2/2017 | Xu et al. |
| 2019/0112468 A1 | 4/2019 | Almohsin et al. |
| 2019/0249068 A1 | 8/2019 | Zhao et al. |

FOREIGN PATENT DOCUMENTS

| | | |
|---|---|---|
| CN | 107814869 A | 3/2018 |
| CN | 110982011 A | 4/2020 |
| WO | 2019222034 A1 | 11/2019 |
| WO | 2021040758 A1 | 3/2021 |

OTHER PUBLICATIONS

Liu, Ruiqiong et al. "Tough and highly stretchable graphene oxide/polyacrylamide nanocomposite hydrogels", Journal of Materials Chemistry, vol. 22, No. 28, Jan. 1, 2012, pp. 14160-14167.
Almoshin et al., "A Novel Polymer Nanocomposite Graphene Based Gel for High Temperature Water Shutoff Applications", Society of Petroleum Engineers, SPE-192358-MS, 18 pgs, Apr. 2018.
Al-Muntasheri et al., "Investigation of a High Temperature Organic Water Shutoff Gel: Reaction Mechanisms", Society of Petroleum Engineers,SPE 97530, 9 pgs. Dec. 5-6, 2005.
Al-Muntasheri et al., "A Study of Polyacrylamide-Based Gels Crosslinked with Polyethyleneimine", Society of Petroleum Engineers, SPE Journal, pp. 245-251, Jun. 2009.
Alsharaeh et al., "Evaluation of Nanomechanical Properties of (Styrene-Methyl Methacrylate) Copolymer Composites Containing Graphene Sheets", American Chemical Society, vol. 52, pp. 17871-17881, Nov. 27, 2013.
Alsharaeh et al., "Microwave Irradiation Effect on the Dispersion and Thermal Stability of RGO Nanosheets within a Polystyrene Matrix", Materials, vol. 7, pp. 5212-5224, Jul. 18, 2014.
Donovan et al., "Delaying Gelation of Aqueous Polymers at Elevated Temperatures Using Novel Organic Drosslinkers", Society of Petroleum Engineers, SPE 37246, pp. 361-371, Feb. 18-21, 1997.
Fathima et al., "Polymer Nanocomposites for water shutoff application—A review", Matter Res. Express, vol. 6, 18 pgs., 2019.
Taha et al., "Nano Graphene Application Improving Drilling Fluids Performance", International Petroleum Technology Conference, IPTC-18539-MS, 16 pgs., Dec. 6-9, 2015.
Tongwa et al., "Evaluation of a Nanocomposite Hydrogel for Water Shut-Off in Enhanced Oil Recovery Applications: Design, Synthesis, and Characterization", Journal of Applied Polymer Science, 8 pgs, Jun. 15, 2012.
Zolfaghari et al., "Preparation and Characterization of Nanocomposite Hydrogels Based on Polyacrylamide for Enhanced Oil Recovery Applications", Journal of Applied Polymer Science, vol. 100, pp. 2096-2103, 2006.
U.S. Office Action dated Aug. 30, 2021 pertaining to U.S. Appl. No. 16/854,323, filed Apr. 21, 2020, 33 pages.
NaturePortfolio, https://www.nature.com/subjects/gels-and-hydrogels downloaded on Aug. 10, 2021, pp. 1-4.
Katsnelson, M.I., "Graphene: Carbon in two dimensions", Materialstoday, 2007, 10, pp. 20-27.
Jiang, H. et al. "Room-temperature self-healing tough nanocomposite hydrogel crosslinked by zirconium hydroxide nanoparticles", Composites Science and Technology, 2017, 140, pp. 54-62.
International Search Report and Written Opinion dated Apr. 23, 2021 pertaining to International application No. PCT/US2020/066636 filed Dec. 22, 2020, 16 pgs.
Michael, F. M. et al. "Zirconia/graphene nanocomposites effect on the enhancement of thermo-mechanical stability of polymer hydrogels", Materials Today Communications, [Online] vol. 21, Dec. 1, 2019, p. 100701.
International Search Report and Written Opinion dated Jan. 29, 2021 pertaining to International application No. PCT/US2020/055337 filed Oct. 13, 2020, 17 pgs.
U.S. Notice of Allowance and Fee(s) Due dated Dec. 10, 2021 pertaining to U.S. Appl. No. 16/854,299 filed Apr. 21, 2020, 38 pages.

POLYMER-SAND NANOCOMPOSITE FOR WATER SHUTOFF

TECHNICAL FIELD

The present disclosure relates to natural resource well drilling and hydrocarbon production from subterranean formations and, more specifically, to a polymer-sand nanocomposite for eliminating or reducing water production in a hydrocarbon wellbore.

BACKGROUND

The discovery and extraction of hydrocarbons, such as oil or natural gas, from subterranean formations may be impeded for a variety of reasons, such as produced water in the reservoir. Specifically, produced water is a significant concern for the oil and gas industry resulting in incurred handling costs and oil recovery costs as well as affecting productivity through scale formation, corrosion of the field equipment and potential formation failure. Before discharge or reinjection, the produced water needs to be treated to meet governmental regulations and prevent environmental pollution. To overcome these issues economically, water production is minimized for water shutoff treatments applied to zones via mechanical isolation or chemical based isolation or by drilling in a manner to avoid produced water. Polymer-based products exist for water shutoff and enhanced oil recovery, yet they lack chemical and thermal stability.

SUMMARY

Accordingly, there is an ongoing need for methods of forming a barrier to shut off or reduce unwanted production of water in a subterranean formation which possess chemical and thermal stability. The methods of the present disclosure include preparing a polymer-sand nanocomposite for water shutoff. In particular, the methods of the present disclosure include preparation of a polymer-sand nanocomposite for water shutoff in which a polymer hydrogel and sand particles having a surface polymerization are combined. Combining the water reducing properties of the polymer hydrogel with surface polymerized sand allows unwanted water production to be reduced, hydrocarbon outcome sustained, and overall extraction costs to be reduced.

According to one or more embodiments of the present disclosure, a method of preparing a polymer-sand nanocomposite for water shutoff is disclosed. The method includes applying a surface polymerization to the surface of sand particles. The surface polymerization is applied to the surface of the sand particles by combining a polymerization initiator dissolved in a solvent with the sand particles to form a precursor sand mixture, combining a co-monomer and additional polymerization initiator in the presence of graphene, where the graphene is not functionalized, to form a precursor polymer mixture, and combining the precursor sand mixture and the precursor polymer mixture to form a sand-copolymer-graphene nanocomposite. Further, the method includes drying the sand-copolymer-graphene nanocomposite. A polymer hydrogel is then prepared by combining a hydrogel polymer, an organic cross-linker, and a salt. Finally, the method includes combining the polymer hydrogel and the sand-copolymer-graphene nanocomposite to crosslink the sand-copolymer-graphene nanocomposite with the polymer hydrogel to form the polymer-sand nanocomposite.

According to one or more further embodiments of the present disclosure, a method of forming a barrier to shut off or reduce unwanted production of water in a subterranean formation is disclosed. The method includes injecting a polymer-sand nanocomposite into one or more water producing fractures in the subterranean formation. The polymer-sand nanocomposite includes sand with a surface polymerization mixed with a polymer hydrogel. The surface polymerization of the sand includes non-functionalized graphene and a co-polymer comprising two or more of polystyrene, poly(methyl methacrylate), polyacyrlonitrile, polyvinyl alcohol, polyethylene terephthalate, polybutylene terephthalate, hydrolyzed polyacrylamide, polycarbonate, polyethylene, polyurethane, polypropylene, and acrylonitrile butadiene styrene.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

FIGURE (FIG. 1A is a schematic drawing of a subterranean showing fractures connecting a wellbore and a water bearing zone.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1A:
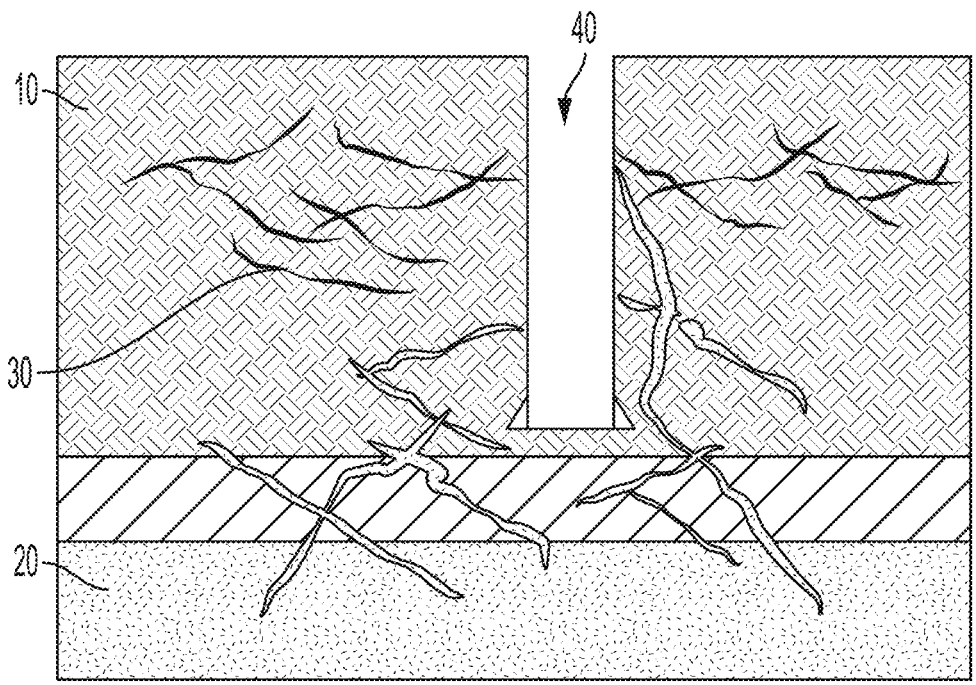
FIG. 1B is a schematic drawing of the subterranean formation of FIG. 1A with injection of the polymer-sand nanocomposite in accordance with one or more embodiments described in this disclosure.

Reference will now be made in detail to embodiments of a method of preparing a polymer-sand nanocomposite for water shutoff and an associated method of forming a barrier to shut off or reduce unwanted production of water in a wellbore utilizing the polymer-sand nanocomposite.

As used throughout this disclosure, the term "production tubing" refers to a wellbore tubular used to produce reservoir fluids. Production tubing is assembled with other completion components to make up the production string. The production tubing selected for any completion should be compatible with the wellbore geometry, reservoir production characteristics and the reservoir fluids.

As used throughout this disclosure, the term "coiled tubing" refers to a long, continuous length of pipe wound on a spool. The pipe is straightened prior to pushing into a wellbore and rewound to coil the pipe back onto the transport and storage spool. It will be appreciated that coiled tubing may be 5,000 meters (m) or greater in length. Coiled tubing may be provided as a secondary and separated conduit through the wellbore and may be passed within the annulus of the production tubing. Coiled tubing may also be used as part of the production tubing.

The present disclosure is directed to compositions and methods for shutting off or reducing unwanted production of water within a subterranean formation. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon regions of the subterranean formation, production wells are drilled to a depth that enables these hydrocarbons to travel from the subterranean formation to the surface.

The hydrocarbons from the hydrocarbon regions of the subterranean formation passes through fractures in the subterranean formation to reach a wellbore for extraction to the surface. As used in the present disclosure, the term "wellbore" may refer to the drilled hole or borehole, including the openhole or uncased portion of the well. Initially, the formation pressure may be considerably greater than the downhole pressure inside the wellbore. This differential pressure may drive hydrocarbons through fractures in the subterranean formation toward the wellbore and up to the surface.

However, the wellbore may also be in fluid communication with water bearing zones within the subterranean formation. As used in the present disclosure, the term "water bearing zones" may refers to the regions of the subterranean formation having water that occurs naturally within the pores of rock. The fractures within the subterranean formation which allows for hydrocarbons to flow to the wellbore also allows formation water from the water bearing zones to flow to the wellbore.

Embodiments of the present disclosure include methods of forming a barrier to shut off or reduce unwanted production of water in a subterranean formation. The method includes injecting a polymer-sand nanocomposite into one or more water producing fractures in the subterranean formation. In accordance with the present disclosure, the polymer-sand nanocomposite may be formed from a sand with a surface polymerization mixed with a polymer hydrogel where the surface polymerization includes a co-monomer and non-functionalized graphene.

Figure 1B:
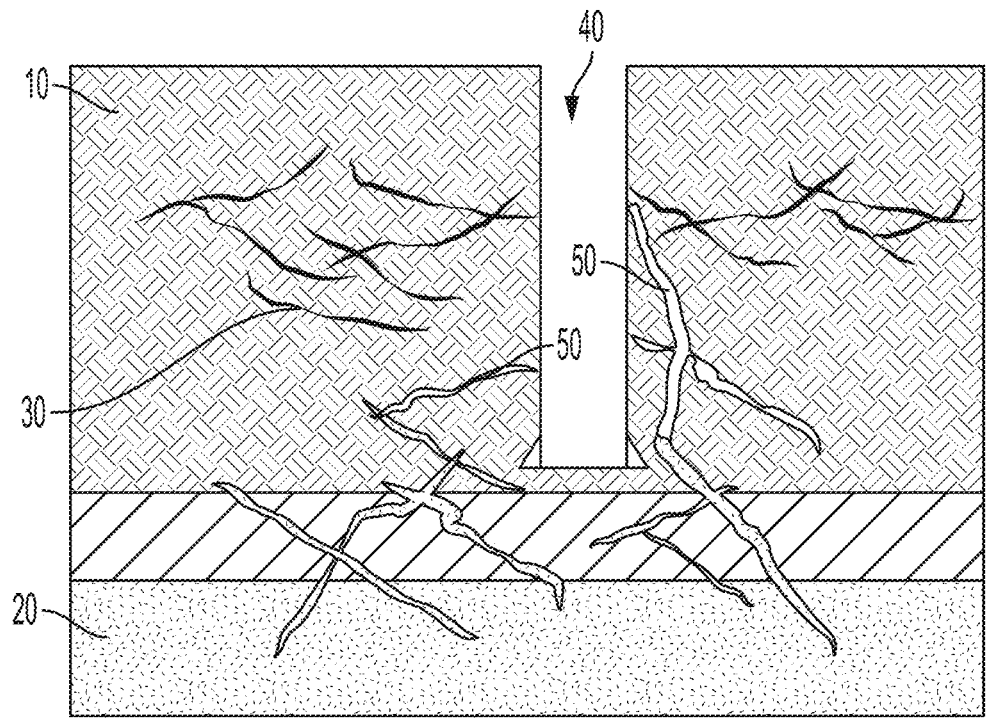

With reference to FIGS. 1A and 1B, a production well and associated fractures are illustrated. The subterranean formation includes a hydrocarbon bearing zone 10 and a water bearing zone 20. The hydrocarbon bearing zone 10 is characterized by the region of the subterranean formation which includes recoverable hydrocarbons within the matrix of the subterranean formation. The water bearing zone 20 is characterized by the region of the subterranean formation having water that occurs naturally within the pores of rock. Each of the hydrocarbon bearing zone 10 and the water bearing zone 20 are interlaced with fractures 30 which facilitate flow of hydrocarbons, formation water, or both through the subterranean formation. To recover the hydrocarbons within the subterranean formation, a wellbore 40 is provided within the subterranean formation in fluid communication with the fractures 30.

The water bearing zone 20 of the subterranean formation may be sequestered from the wellbore 40 by introduction of the polymer-sand nanocomposite into water producing fractures in the subterranean formation. It will be appreciated that the water producing fractures are the fractures 30 which are in fluid communication with the water bearing zone 20 and the wellbore 40 thus are capable of flowing formation water from the water bearing zone 20 to the wellbore 40. FIG. 1A provides an illustration of the subterranean formation prior to treatment in accordance with methods of the present disclosure and FIG. 1B provides an illustration of the water producing fractures obstructed with the polymer-sand nanocomposite 50.

It will be appreciated that the fractures 30 interlaced throughout the subterranean formation may be naturally occurring or induced with enhanced oil recovery techniques such as fracturing operations. The methods for shutting off or reducing unwanted production of water in the subterranean formation with the polymer-sand nanocomposite of the present disclosure may be applied to all fractures 30 regardless of whether they are naturally occurring or induced with enhanced oil recovery techniques.

Forming a barrier to shut off or reduce unwanted production of water in a subterranean formation involves injecting a polymer-sand nanocomposite in accordance with the present disclosure into one or more water producing fractures in the subterranean formation. It will be appreciated that the polymer-sand nanocomposite may be injected into the water producing fractures in accordance with methods and techniques familiar to those skilled in the art for placement of drilling or treatment fluids within the fractures of a subterranean formation. In one or more embodiments, the polymer-sand nanocomposite may be injected into the water producing fractures via coiled tubing or production tubing placed downhole. The polymer-sand nanocomposite may further be directed to the fractures desired for treatment with the placement of bridge plugs or other devices to direct or obstruct flow.

Figure 2:
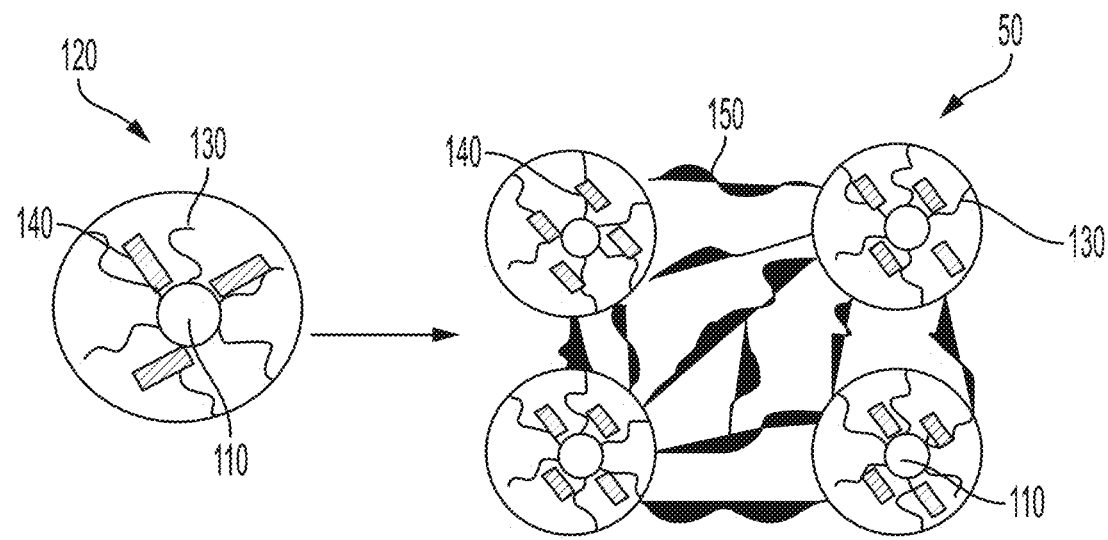
FIG. 2 is a schematic drawing of a polymer-sand nanocomposite in accordance with one or more embodiments described in this disclosure.

The polymer-sand nanocomposite 50 is formed by combining a polymer hydrogel 150 and a sand-copolymer-graphene nanocomposite 120 such that the sand-copolymer-graphene nanocomposite 120 crosslinks with the polymer hydrogel 150 as illustrated in FIG. 2. In one or more embodiments, a method of preparing the polymer-sand nanocomposite 50 for water shutoff comprises applying a surface polymerization to the surface of sand particles 110 to form the sand-copolymer-graphene nanocomposite 120, drying the sand-copolymer-graphene nanocomposite 120, preparing the polymer hydrogel 150, and combining the polymer hydrogel 150 and the sand-copolymer-graphene nanocomposite 120 to crosslink the sand-copolymer-graphene nanocomposite 120 with the polymer hydrogel 150 to form the polymer-sand nanocomposite 50. Preparation of the sand-copolymer-graphene nanocomposite 120 by applying a surface polymerization to the surface of the sand particles 110 includes combining a polymerization initiator dissolved in a solvent with the sand particles 110 to form a precursor sand mixture, combining a co-monomer and additional polymerization initiator in the presence of graphene 140 to form a precursor polymer mixture, and combining the precursor sand mixture and the precursor polymer mixture to form the sand-copolymer-graphene nanocomposite 120. The sand-copolymer-graphene nanocomposite 120 may be characterized by a sand particle 110 forming a core with co-polymer 130 formed from polymerization of the co-monomer and graphene 140 forming a shell. It will further be understood that the graphene 140 is not functionalized prior to formation of the precursor polymer mixture. Additionally, the polymer hydrogel 150 may be formed by combining a hydrogel polymer, an organic cross-linker, and a salt. Further details regarding preparation of the polymer-sand nanocomposite 50 are provided throughout the present disclosure.

The polymerization initiator is dissolved in a solvent and combined with the sand particles 110 to form the precursor sand mixture. In one or more embodiments, the polymerization initiator is primarily peroxide which is susceptible to dissociate into radicals under exposure of light or heating conditions. For example, the polymerization initiator may be azobisisobutyronitrile (AIBN) or benzoyl peroxide. Further examples include tert-Amyl peroxybenzoate, 1,1'-Azobis (cyclohexanecarbonitrile), 1,1-Bis(tert-butylperoxy)cyclohexane, 2,5-Bis(tert-butylperoxy)-2,5 dimethyl hexane 2,5-Bis(tert-Butylperoxy)-2,5 dimethyl 3-hexyne, tert-Butyl hydroperoxide, tert-Butyl peracetate, tert-Butyl peroxide, tert-Butyl peroxybenzoate, tert-Butylperoxy isopropyl carbonate, cumene hydroperoxide, cyclohexanone peroxide, dicumyl peroxide, lauroyl peroxide, 2,4-pentanedione peroxide, peracetic acid, and Potassium persulfate. The polymerization initiator may be dissolved in a solvent for mixture with the sand particles 110. The polymerization initiator and solvent may be combined in a range between 1 to 10 weight percent (wt. %) of initiator to solvent. In one or more embodiments, the solvent is an organic solvent. For example, the solvent may be acetone, methanol, ethanol, iso-propanol, n-propanol, chloroform, tetrahydrofuran, or N-methyl pyrrolidone.

In one or more embodiments, the sand particles 110 may have a size distribution of 20 mesh (840 micrometers) to 40 mesh (420 micrometers).

In one or more embodiments, the polymerization initiator may be combined with the sand particles 110 and mixed with sonication for at least 30 minutes. In various embodiments, the sonication to mix the polymerization initiator and the sand particles 110 may be sustained for 30 minutes to 2 hours, 30 minutes to 1.5 hours, 45 minutes to 1.25 hours, or approximately 1 hour.

Upon completion of the sonication, the mixture of the polymerization initiator and the sand particles 110 may be heated to remove the solvent in an expeditious manner to form the precursor sand mixture. In various embodiments, the temperature of the mixture of the polymerization initiator and the sand particles 110 may be raised to 35° C. to 70° C., 40° C. to 70° C., or approximately 45° C. It will be appreciated that the solvent may also be removed from mixture of the polymerization initiator and the sand particles 110 to alternatively form the precursor sand mixture through natural evaporation without supplemental heating or through vacuum assisted evaporation to accelerate the evaporation rate of the solvent through pressure adjustment.

The precursor polymer mixture may be formed by combining co-monomer and additional polymerization initiator in the presence of graphene 140. In one or more embodiments, the co-monomer and graphene 140 are mixed and then the polymerization initiator is added to the previously combined co-monomer and graphene 140 mixture. It will be appreciated that if the graphene 140 is not premixed with the co-monomer, there may be a reduction in the final dispersion within the polymer matrix of the formed co-polymer 130. The co-monomer, graphene 140, and polymerization initiator may then be mixed with sonication. In various embodiments, the sonication to mix the co-monomer, graphene 140, and polymerization initiator may be sustained for 5 minutes to 30 minutes, 5 minutes to 20 minutes, approximately 10 minutes, at least 5 minutes, or at least 10 minutes. It will be appreciated that the co-monomer may form the co-polymer 130 upon introduction of the polymerization initiator. In one or more embodiments, the mixture of the co-polymer 130, graphene 140, and polymerization initiator may be dried in an oven or equivalent. For example, the mixture of the co-polymer 130, graphene 140, and polymerization initiator may be dried in an oven overnight. The polymerization initiator may be AIBN or benzoyl peroxide, for example, and should be selected to match that utilized in formation of the precursor sand mixture.

The presence of graphene in the sand-copolymer-graphene nanocomposite 120 provides both thermal and mechanical stability to the polymer-sand nanocomposite 50. Specifically, the graphene provides thermal stability to the polymer-sand nanocomposite 50 because the graphene has is inherently thermally stable as it has very high thermal conductivity of approximately 5300 watts per meter-kelvin (W/(m⁻K). The graphene provides mechanical stability to the polymer-sand nanocomposite 50 because of the inherent high mechanical stability of graphene. For example, the intrinsic tensile strength of graphene is approximately 130 gigapascals (GPa) and Young's modulus as great as 1 terapascal (TPa).

In various embodiments, the co-monomers may be selected to form two or more co-polymers 130 of polystyrene (PS), poly(methyl methacrylate) (PMMA), polyacrylonitrile (PAN), polyvinyl alcohol (PVA), polyethylene terephthalate (PET), polybutylene terephthalate (PBT), hydrolyzed polyacrylamide (HPAM), polycarbonate, polyethylene (PE), polyurethane (PU), polypropylene (PP), and acrylonitrile butadiene styrene. In one or more embodiments, the co-monomers may comprise a styrene monomer and a methyl methacrylate monomer to form a co-polymer 130 of PS and PMMA.

In one or more embodiments, the co-monomer may comprise a styrene monomer and a methyl methacrylate monomer. In one or more embodiments, the co-monomer comprises styrene monomer and methyl methacrylate monomer at a volumetric ratio of 1:2 to 2:1. In one or more further embodiments, the co-monomer comprises styrene monomer and methyl methacrylate monomer at a volumetric ratio of 2:3 to 3:2.

In one or more embodiments, the co-monomer is mixed with graphene 140 at a ratio of 2 to 8 wt. % graphene 140 in the precursor polymer mixture. In various further embodiments, the co-monomer is mixed with graphene 140 at a ratio of 2 to 6 wt. % graphene 140, 3 to 5 wt. % graphene 140, or approximately 4 wt. % graphene 140 in the precursor polymer mixture. It will be appreciated that insufficient graphene may not achieve the disclosed property enhancements and excess graphene may result in non-uniform dispersibility issues.

The sand-copolymer-graphene nanocomposite 120 is formed by combining the precursor sand mixture and the precursor polymer mixture. In one or more embodiments, the precursor polymer mixture is added gradually in combination with mixing to the precursor sand mixture. The mixing coats the individual sand particles 110 with the precursor polymer mixture to form a surface polymerization onto the sand 110 directly. In one or more embodiments, the mixing may be carried out by paddle mixer or mechanical mixer for a period of at least 5 min to achieve sufficient integration and coverage of the sand particles.

Upon completion of the mixing of the precursor sand mixture and the precursor polymer mixture to achieve coverage of the co-polymer 130 and graphene 140 across the surface of each individual sand particle 110, the mixture may be heated to remove moisture from the resulting sand-copolymer-graphene nanocomposite 120 in an expeditious manner. In various embodiments, the temperature of the mixture of the precursor sand mixture and the precursor polymer mixture may be raised to 50° C. to 80° C., 60° C. to 80° C., 70° C. to 80° C., or approximately 70° C. In various embodiments, the elevated temperature of the mixture of the precursor sand mixture and the precursor polymer mixture may be maintained for at least 30 minutes, at least 1 hour, 30 minutes to 2 hours, or 30 to 60 minutes.

The polymer hydrogel 150 is formed by combining the hydrogel polymer, the organic cross-linker, and a salt. In one or more embodiments, preparing the polymer hydrogel 150 further comprises combining a filler comprising zirconium hydroxide with water prior to addition of the hydrogel polymer, the organic cross-linker, and the salt. Specifically, the filler comprising zirconium hydroxide may be added to water and sonicated for a period to fully wet the filler. In various embodiments, the sonication to mix the water and filler may be sustained for 2 minutes to 1 hour, 5 minutes to 30 minutes, 10 minutes to 20 minutes, or approximately 15 minutes. It will be appreciated that while the filler and water were combined via sonication, other methods of mixing the constituent components together may also be utilized as known to those skilled in the art.

In one or more embodiments, the water used for wetting the filler comprising zirconium hydroxide may be distilled water. It will be appreciated that various metal and non-metal ions in non-distilled water could interfere with the ongoing chemical reactions.

In one or more embodiments, the filler may be zirconium hydroxide. When utilizing zirconium hydroxide as the filler, in various embodiments, the filler may be combined with the water as 0.2 to 10 wt. %, 0.4 to 5 wt. %, 0.6 to 2 wt. %, 0.6 to 1 wt. %, or approximately 0.8 wt. % $Zr(OH)_4$ relative to the polymer hydrogel.

In one or more embodiments, the filler may be ZrG5. ZrG5 is a composite of zirconium hydroxide and 5 wt. % graphene. When utilizing ZrG5 as the filler, in various embodiments, the filler may be combined with the water as 0.05 to 1 wt. %, 0.1 to 0.8 wt. %, 0.1 to 0.3 wt. %, or approximately 0.2 wt. % ZrG5 relative to the polymer composite hydrogel.

The hydrogel polymer may be combined with water or the water and filler mixture. In various embodiments, the hydrogel polymer may be added to comprise 1 to 8 wt. %, 2 to 6 wt. %, 3 to 5 wt. %, or approximately 4 wt. % of the final polymer-sand nanocomposite. In one or more embodiments, the hydrogel polymer may be combined with the water or the water and filler mixture to form a homogenous solution. In various embodiments, the hydrogel polymer and the water or the water and filler mixture may be stirred for 10 minutes to 4 hours, 30 minutes to 2 hours, 45 minutes to 1.5 hours, or approximately 1 hour with a magnetic stirrer or other mixing system known to those skilled in the art.

In various embodiments, the hydrogel polymer is polyacrylamide (PAM), polyacyrlonitrile (PAN), polyvinyl alcohol (PVA) Polyethylene terephthalate (PET), polybutylene terephthalate (PBT), hydrolysed PAM (HPAM), polycarbonate, polyethylene (PE), polyurethane (PU), polypropylene (PP), or acrylonitrile butadiene styrene. In one or more particular embodiments, the hydrogel polymer is PAM having a molecular weight ranging from 100,000 to 1,000,000 grams per mole (g/mol). In one or more embodiments, the PAM may be a low molecular weight PAM having a molecular weight of approximately 550,000 g/mol.

In one or more embodiments, the organic cross-linker and the salt are added to the previously combined water and hydrogel polymer. Specifically, the organic cross-linker and the salt may be added to the hydrogel polymer and water mixture and stirred for an additional 2 to 30 minutes, 5 to 25 minutes, 10 to 20 minutes, or approximately 15 minutes with a magnetic stirrer or other mixing system known to those skilled in the art. The stirring integrates the organic cross-linker and dissolves the salt into the mixture of water and hydrogel polymer.

The organic cross-linker should include the presence of hydroxyl and amine groups. In various embodiments, the organic cross-linker is N,N'-methylenebisacrylamide (NBAM), a mixture of hydroquinone (HQ) and hexamethylenetetramine (HMT), phenol/formaldehyde, polyethylenimine (PEI), acetylsalicylic acid (ASA), catechol, or resorcinol. In one or more specific embodiments, the organic cross-linker is N,N'-methylenebisacrylamide or a mixture of HQ and HMT. The organic cross-linker may be added to comprise 0.15 to 0.3 wt. % of the final polymer-sand nanocomposite 50.

In various embodiments, the salt is a monovalent salt, a divalent salt, or a combination of monovalent and divalent salts. For example, the salt may be one or more of KCl, $MgCl_2$, $CaCl_2$), or NaCl. The salt may be added to comprise 0.25 to 5 wt. % of the final polymer-sand nanocomposite 50. The weight percentage of salt may vary depending on reservoir conditions with the addition of salt to mimic the reservoir conditions.

In one or more embodiments, the solution comprising the hydrogel polymer, the organic cross-linker, and the salt may be flushed with nitrogen. The nitrogen is flushed to remove dissolved oxygen from the precursor solution to mimic the down-hole conditions. In various embodiments, the nitrogen flush may be continued for 15 seconds to 3 minutes, 20 seconds to 2 minutes, or 30 seconds to 1 minute.

The polymer-sand nanocomposite 50 is then formed by combining the polymer hydrogel 150 and the sand-copolymer-graphene nanocomposite 120. The polymer hydrogel 150 and the sand-copolymer-graphene nanocomposite 120 crosslink forming the polymer-sand nanocomposite 50. In one or more embodiments, the sand-copolymer-graphene nanocomposite 120 and the polymer hydrogel 150 are mixed and then heated for a formation period. In various embodiments, the formation period may comprise heating the mixture to 150 to 180° C., 150 to 170° C., 150 to 160° C., or approximately 150° C. for 8 to 96 hours, 24 to 72 hours, 36 to 60 hours, or approximately 48 hours.

It will be appreciated that inclusion of sand 110 within the structure of the polymer-sand nanocomposite 50 provides multiple desirable benefits. For example, the sand 110 provides a relatively low cost agent to reduce the cost per volume in filling a fracture 30 connected to the water-bearing zone 20. Further, the sand 110 adds strength to the polymer-sand nanocomposite 50.

EXAMPLES

The following examples illustrate features of the present disclosure but are not intended to limit the scope of the disclosure.

An example polymer-sand nanocomposite was prepared to test and demonstrate the stability of the formed polymer-sand nanocomposite under reservoir temperature and conditions. Initially a surface polymerization was added to the surface of sand particles in accordance with methods described in the present disclosure. Specifically, the precursor sand mixture was formed by mixing 300 grams (g) of sand with 0.150 g. of AIBN as the polymerization initiator at room temperature. The AIBN was dissolved in 100 milliliters (mL) of acetone. The mixing of the sand and AIBN was completed by sonication of the mixture for 1 hour. Subsequently, the combined mixture was dried at 45° C. for overnight. The precursor polymer mixture was formed by mixing a co-monomer of 5 ml of styrene (STY) and 5 ml of methyl methacrylate (MMA) in the presence of 4 wt. % (40 milligrams) of a non-functionalize graphene with 20 milligrams (mg) AIBN. The formed solution was then sonicated for 10 minutes. Subsequently, the formed precursor sand mixture and precursor polymer mixture were combined together and mixed and then dried in an oven at 70° C. overnight to form the sand-copolymer-graphene nanocomposite.

The polymer hydrogel was formed in accordance with the methods of the present disclosure. Specifically, 0.8 wt. % $Zr(OH)_4$ (40 mg) or 0.2 wt. % ZrG5 (10 mg) was added to 5 ml of distilled water and sonicated for 15 minutes. Subsequently, 4 wt. % of PAM (200 mg) having a molecular weight of 550,000 g/mol was added and integrated by magnetic stirrer for 1 hour. Then 0.3 wt. % of HG and HMT (60 mg) in a 1:1 ratio and 2 wt. % KCl were added and stirred for an additional 15 minutes. The formed solution was then flushed with nitrogen for about 30 seconds to 1 minute.

The sand-copolymer-graphene nanocomposite and the polymer hydrogel were then combined and placed in an oven at 150° C. for 48 hours to form the final polymer-sand nanocomposite for stability testing.

Figure 3:
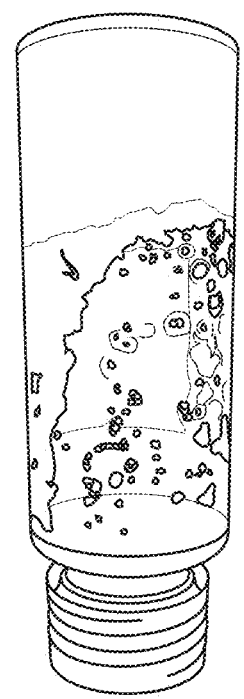
FIG. 3 is a photograph of a polymer-sand nanocomposite prepared in accordance with one or more embodiments described in this disclosure after 15 days of curing at 150° C.

To test the stability of the polymer-sand nanocomposite, the formed polymer-sand nanocomposite was placed in an oven at 150° C. for 15 days. At the conclusion of the 15 days it was demonstrated that the polymer-sand nanocomposite was still stable and well gelled with the polymer-sand nanocomposite remaining compacted. The test specimen is illustrated in FIG. 3 in an inverted vial at the conclusion of the 15 day cure at 150° C. and shows the retention of gelled characteristics. This extended period of thermal stability is beneficial to water shutoff applications, especially in reservoirs at elevated temperatures, as it allows the polymer-sand nanocomposite to be retained in the fractures connected to the water bearing zone without breakdown. It will be appreciated that subterranean formations commonly have natural or induced fractures which experience temperatures in the range of 90 to 150° C. and as such, the polymer-sand nanocomposite of the present disclosure being demonstrated to retain its gelled characteristics at 150° C. allows it to be implemented in water shutoff operations without thermal breakdown.

Further evaluation of the example polymer-sand nanocomposite demonstrated thermal stability up to a temperature of 180° C. before breakdown of the gelling in the polymer-sand nanocomposite. Specifically, thermogravimetric and dynamic scanning calorimetric data confirm stability of the material up to 180° C. before instability is noted.

Figure 4A:
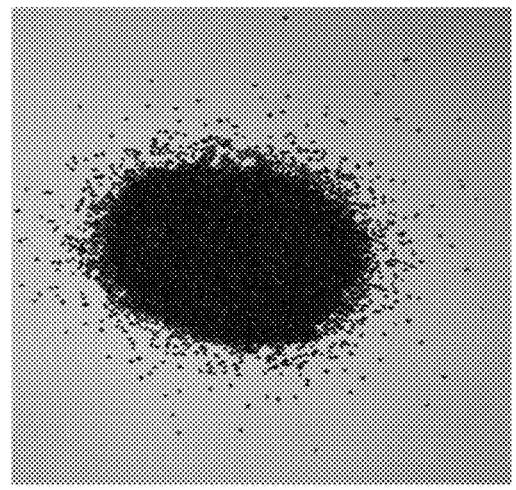
FIG. 4A is a photograph of a sand-copolymer-graphene nanocomposite prepared in accordance with one or more embodiments described in this disclosure.
Figure 4B:
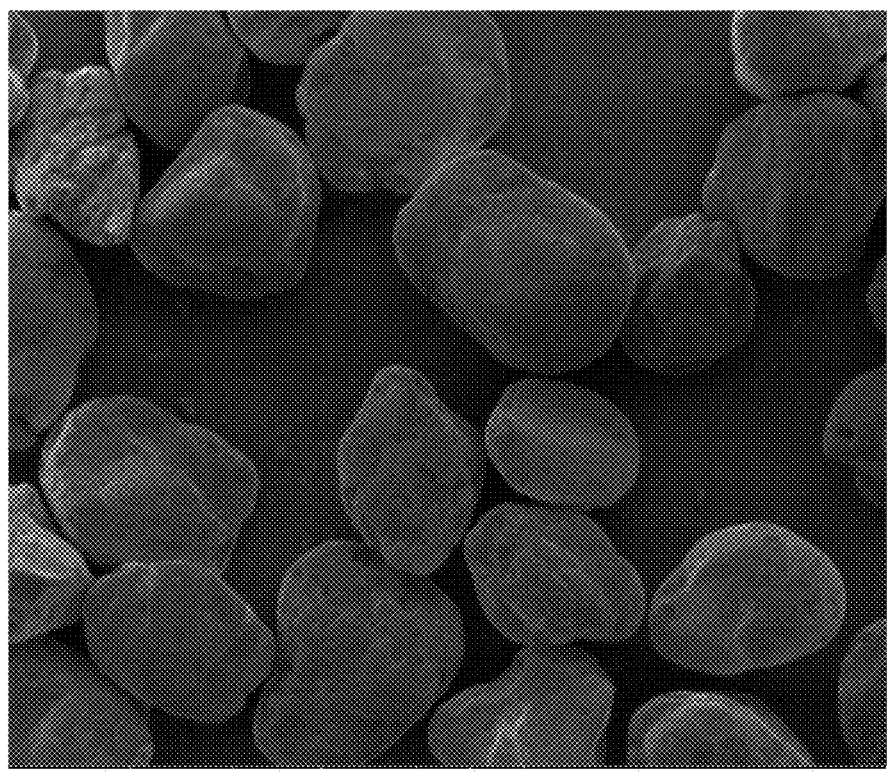
FIG. 4B is a SEM image of the sand-copolymer-graphene nanocomposite of FIG. 4A.

The sand-copolymer-graphene nanocomposite used to form the example polymer-sand nanocomposite is illustrated in FIGS. 4A and 4B. FIG. 4A shows the granular nature of the sand particles having a surface polymerization of polystyrene and poly(methyl methacrylate) in conjunction with graphene. Further, FIG. 4B provides a SEM image of the individual sand particles with the surface polymerization.

Figure 5A:
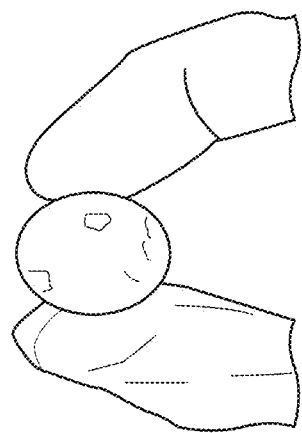
FIG. 5A is a photograph of a polymer-sand nanocomposite prepared in accordance with one or more embodiments described in this disclosure.
Figure 5B:
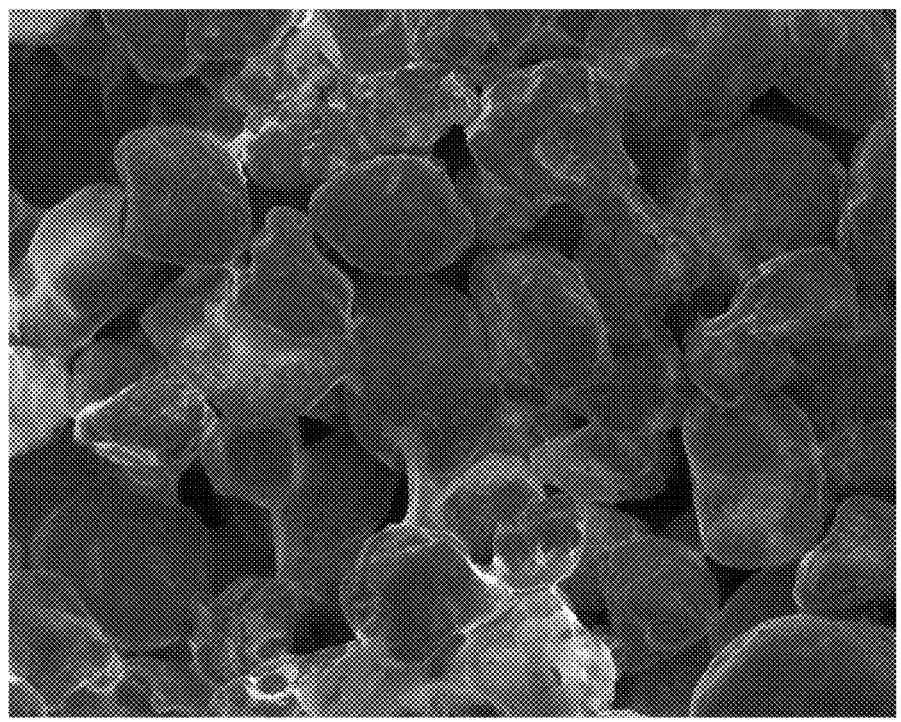
FIG. 5B is a SEM image of the polymer-sand nanocomposite of FIG. 5A.

The example polymer-sand nanocomposite is illustrated in FIGS. 5A and 5B. FIG. 5A shows the gelled characteristic of the polymer-sand nanocomposite. Further, FIG. 5B provides a SEM image which shows the connectivity between grains of the surface polymerized sand. Specifically, the individual grains of the sand-copolymer-graphene nanocomposite are entrapped by the crosslinked PAM molecules in the polymer-sand nanocomposite such that the individual grains of the sand-copolymer-graphene nanocomposite are held together. This network of connectivity and the entrapped individual grains of the sand-copolymer-graphene nanocomposite provide the water barrier properties when implemented as a barrier to shut off or reduce unwanted production of water in a subterranean formation.

It should now be understood the various aspects of the method of preparing a polymer-sand nanocomposite and associated method of forming a barrier to shut off or reduce unwanted production of water in a subterranean formation utilizing the same are described and such aspects may be utilized in conjunction with various other aspects.

According to a first aspect, a method of preparing a polymer-sand nanocomposite for water shutoff includes applying a surface polymerization to the surface of sand particles. The surface polymerization is applied to the surface of the sand particles by combining a polymerization initiator dissolved in a solvent with the sand particles to form a precursor sand mixture, combining a co-monomer and additional polymerization initiator in the presence of graphene, where the graphene is not functionalized, to form a precursor polymer mixture, and combining the precursor sand mixture and the precursor polymer mixture to form a sand-copolymer-graphene nanocomposite. The method of preparing a polymer-sand nanocomposite further includes drying the sand-copolymer-graphene nanocomposite, preparing a polymer hydrogel by combining a hydrogel polymer, an organic cross-linker, and a salt, and combining the polymer hydrogel and the sand-copolymer-graphene nanocomposite to crosslink the sand-copolymer-graphene nanocomposite with the polymer hydrogel to form the polymer-sand nanocomposite.

A second aspect includes the method of the first aspect in which the hydrogel polymer is selected from polyacrylamide (PAM), polyacyrlonitrile (PAN), polyvinyl alcohol (PVA) Polyethylene terephthalate (PET), polybutylene terephthalate (PBT), hydrolysed PAM (HPAM), polycarbonate, polyethylene (PE), polyurethane (PU), polypropylene (PP), or acrylonitrile butadiene styrene.

A third aspect includes the method of the first or second aspects in which the salt is a monovalent salt, a divalent salt, or a combination of monovalent and divalent salts.

A fourth aspect includes the method of any of the first through the third aspects in which combining the polymerization initiator and the sand particles comprises sonication for at least 30 minutes and subsequent heating to remove the solvent and form the precursor sand mixture.

A fifth aspect includes the method of any of the first through fourth aspects in which the co-monomer comprises styrene monomer and methyl methacrylate monomer at a volumetric ratio of 1:2 to 2:1.

A sixth aspect includes the method of any of the first through fourth aspects in which the co-monomer comprises styrene monomer and methyl methacrylate monomer at a volumetric ratio of 2:3 to 3:2.

A seventh aspect includes the method of any of the first through sixth aspects in which the precursor polymer mixture comprises 2 to 8 weight percent graphene.

An eighth aspect includes the method of any of the first through seventh aspects in which the polymerization initiator comprises azobisisobutyronitrile.

A ninth aspect includes the method of any of the first through eighth aspects in which preparing the polymer hydrogel further comprises combining a filler comprising zirconium hydroxide with water prior to addition of the hydrogel polymer, the organic cross-linker, and the salt.

A tenth aspect includes the method of any of the first through ninth aspects in which the filler is ZrG5.

An eleventh aspect includes the method of any of the first through tenth aspects in which the organic cross-linker is N,N'-methylenebisacrylamide or a mixture of hydroquinone and hex amethylenetetramine.

A twelfth aspect includes the method of any of the first through eleventh aspects in which the sand particles have a size distribution of 20 to 40 mesh.

According to a thirteenth aspect, a method of forming a barrier to shut off or reduce unwanted production of water in a subterranean formation includes injecting a polymer-sand nanocomposite into one or more water producing fractures in the subterranean formation. The polymer-sand nanocomposite comprises sand with a surface polymerization mixed with a polymer hydrogel. The surface polymerization comprises non-functionalized graphene and a co-polymer comprising two or more of polystyrene, poly(methyl methacrylate), polyacyrlonitrile, polyvinyl alcohol, polyethylene terephthalate, polybutylene terephthalate, hydrolyzed polyacrylamide, polycarbonate, polyethylene, polyurethane, polypropylene, and acrylonitrile butadiene styrene.

A fourteenth aspect includes the method of the thirteenth aspect in which the polymer hydrogel comprises a hydrogel polymer, an organic cross-linker, and a salt.

A fifteenth aspect includes the method of the fourteenth aspect in which the hydrogel polymer is selected from polyacrylamide (PAM), polyacyrlonitrile (PAN), polyvinyl alcohol (PVA) Polyethylene terephthalate (PET), polybutylene terephthalate (PBT), hydrolysed PAM (HPAM), polycarbonate, polyethylene (PE), polyurethane (PU), polypropylene (PP), acrylonitrile butadiene styrene.

A sixteenth aspect includes the method of the fourteenth or fifteenth aspects in which the salt is a monovalent salt, a divalent salt, or a combination of monovalent and divalent salts.

A seventeenth aspect includes the method of the any of the thirteenth through sixteenth aspects in which the surface polymerization comprises 2 to 8 weight percent of the non-functionalized graphene.

An eighteenth aspect includes the method of any of the fourteenth through seventeenth aspects in which the polymer hydrogel further comprises a filler, the filler comprising zirconium hydroxide.

A nineteenth aspect includes the method of the eighteenth aspect in which the filler is ZrG5.

A twentieth aspect includes the method of the any of the thirteenth through nineteenth aspects in which the sand particles have a size distribution of 20 to 40 mesh.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A method of preparing a polymer-sand nanocomposite for water shutoff, the method comprising:
    applying a surface polymerization to the surface of sand particles by:
        combining a polymerization initiator dissolved in a solvent with the sand particles to form a precursor sand mixture;
        combining a co-monomer and additional polymerization initiator in the presence of graphene, where the graphene is not functionalized, to form a precursor polymer mixture; and
        combining the precursor sand mixture and the precursor polymer mixture to form a sand-copolymer-graphene nanocomposite;
    drying the sand-copolymer-graphene nanocomposite;
    preparing a polymer hydrogel by combining a hydrogel polymer, an organic cross-linker, and a salt; and
    combining the polymer hydrogel and the sand-copolymer-graphene nanocomposite to crosslink the sand-copolymer-graphene nanocomposite with the polymer hydrogel to form the polymer-sand nanocomposite.

2. The method of claim 1, where the hydrogel polymer is selected from polyacrylamide, polyacyrlonitrile, polyvinyl alcohol, Polyethylene terephthalate, polybutylene terephthalate, hydrolyzed PAM, polycarbonate, polyethylene, polyurethane, polypropylene, or acrylonitrile butadiene styrene.

3. The method of claim 1, where the salt is a monovalent salt, a divalent salt, or a combination of monovalent and divalent salts.

4. The method of claim 1, where combining the polymerization initiator and the sand particles comprises sonication for at least 30 minutes and subsequent heating to remove the solvent and form the precursor sand mixture.

5. The method of claim 1, where the co-monomer comprises styrene monomer and methyl methacrylate monomer at a volumetric ratio of 1:2 to 2:1.

6. The method of claim 1, where the co-monomer comprises styrene monomer and methyl methacrylate monomer at a volumetric ratio of 2:3 to 3:2.

7. The method of claim 1, where the precursor polymer mixture comprises 2 to 8 weight percent graphene.

8. The method of claim 1, where the polymerization initiator comprises azobisisobutyronitrile.

9. The method of claim 1, where preparing the polymer hydrogel further comprises combining a filler comprising zirconium hydroxide with water prior to addition of the hydrogel polymer, the organic cross-linker, and the salt.

10. The method of claim 9, where the filler is ZrG5.

11. The method of claim 1, where the organic cross-linker is N,N'-methylenebisacrylamide or a mixture of hydroquinone and hexamethylenetetramine.

12. The method of claim 1, where the sand particles have a size distribution of 20 to 40 mesh.

* * * * *